United States Patent Office 3,289,794
Patented Dec. 6, 1966

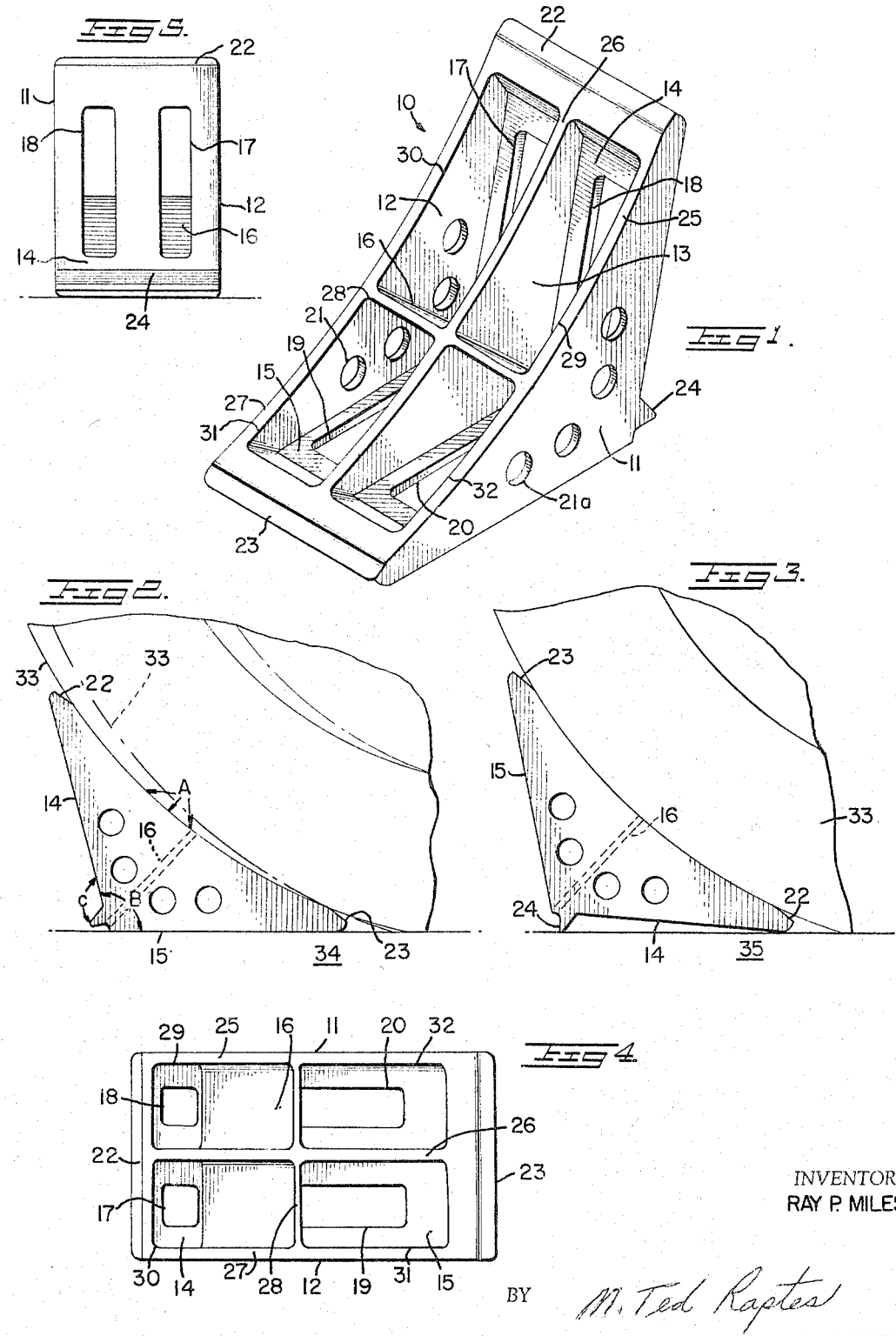

3,289,794
WHEEL CHOCK
Ray P. Miles, 8575 N. Melody Lane, Northfield, Ohio
Filed Nov. 3, 1965, Ser. No. 506,221
10 Claims. (Cl. 188—32)

This invention relates to wheel chocks and more particularly to an improved reversible wheel chock.

Wheel chocks are used for the purpose of preventing forward or backward movement by holding vehicles such as trucks, trailers and the like secure when loading or unloading. The parked units are held safely to prevent accidental movement caused by brake failure or bumping.

The wheel chock of this invention embodies a new and improved unit which is easily manufactured as a casting. Particularly, the novel wheel chock embodies a reversible feature containing two bottom walls permitting its use in two positions. The two bottom walls permit use of the wheel chock on any surface in any weather and even on sloping surfaces. Additionally important is the wheel engaging surface which is designed to permit the tire of a wheel to mold itself into the surface to provide better gripping power. Of additional importance is the provision of a calk on one bottom wall which is designed to grip a surface such as ice or snow and which is out of the way when the other bottom wall is in use on concrete or blacktop to prevent harm thereto.

Accordingly, this invention provides an improved wheel chock formed of a unitary casting comprising a wheel engaging surface of particulate design, a pair of side walls, reinforcing intermediate walls, and a calk for engaging particular surfaces. The invention provides further features in a novel wheel chock which will become apparent by those familiar in the art from the following description of an embodiment of the invention as illustrated in the accompanying drawing in which:

FIGURE 1 is a perspective view of the novel wheel chock of this invention;

FIGURE 2 is a side elevational view of a wheel engaging the wheel chock wherein the calk point is in an up position;

FIGURE 3 is a side elevational view of a wheel engaging the wheel chock wherein the calk point is in a down position;

FIGURE 4 is a top plan view of the wheel chock illustrated in FIGURE 1;

FIGURE 5 is a rear end elevational view of the wheel chock illustrated in FIGURE 1.

The wheel chock, indicated generally by numeral 10, is an integrally cast metal block comprising side walls 11 and 12, interior wall 13, bottom walls 14 and 15, and a transverse reinforcing wall 16. Bottom walls 15 and 16 are substantially planar on their outer surfaces and contain openings 17, 18 and 19, 20 respectively. Side walls 11 and 12 contain a series of holes such as 21 and 21a. The openings 17–20 and 21 and 21a are for the purpose of reducing the overall weight of the block, to provide easy pick-up and handling, and to allow chains to be passed therethrough for bolting the block to secure it against pilferage.

The block comprises toe plate 22 at one end of bottom wall 14 and another toe plate 23 at one end of bottom wall 15. A calk 24 is disposed along the outer surface of bottom wall 14 near the juncture of bottom walls 14 and 15 and extends between side walls 11 and 12. The calk is generally triangular in shape and forms an obtuse angle C with the planar outer face of bottom wall 14. The end of the calk does not extend below the planar outer surface of the bottom wall 15. The purpose of the toe plates and calk will be described hereinafter.

The wheel chock contains a curved face A (FIGURE 2) formed by the end surfaces 25, 26, 27, and 28 of walls 11, 13, 12 and 16 respectively. Toe plates 22 and 23 form a continuing portion of the face surface. The face comprises openings 29, 30, 31 and 32 at the face surface.

The bottom walls 14 and 15 are formed at an angle B (FIGURE 2) to each other which is equal to or greater than 90°, the purpose of which will be seen hereinafter.

The wheel chock of this invention is designed to be used on either bottom wall 14 or 15 depending on the surface on which it is intended to be used. Bottom wall 15 of the chock is used on hard surfaces such as concrete, blacktop, etc. In this position the calk point is in an up position. On ice or snow surfaces, or other hard surfaces where traction is required to hold the chock, the bottom surface 14 is used and the calk point grips the surface.

Referring to FIGURES 2 and 3, the advantages of the novel wheel chock of the invention will become manifest. In FIGURE 2, the wheel chock is positioned on bottom wall 15 on a surface 34 such as concrete not requiring the use of the calk. The outer surface of a tire 33 is shown (in phantom) in position initially engaging the toe plate 23. The tire easily rolls onto the toe plate thereby applying the load of the wheel and axle substantially vertically on the chock, preventing its movement, before the tire reaches the point where it actually is being blocked. In addition, the tire after passing the toe plate becomes gradually molded into the openings 31 and 32 of the face, thus further facilitating against movement of the chock. Thereafter, continued movement of the tire brings it into flush engagement with the face surfaces in addition to being molded into openings 29, 30, 31, and 32. Thus, the weight of the tire and load provide the holding power, while the chock firmly grips the tire and the surface. Effective blocking of the tire and vehicle are thereby obtained. Since the pressure is substantially evenly distributed on the base wall, no harm is inflicted on the surface 34, and maximum traction is obtained.

In FIGURE 3, the wheel chock is positioned on bottom wall 14 on a surface 35 such as ice which requires the use of the calk 24 for further traction. In the same manner, as heretofore described, the tire 33 initially rolls onto toe plate 22 and into openings 29 and 30 thereby applying the load substantially vertically on the chock and preventing movement thereof. Continued movement of the tire forces the calk 24 into the surface 35 providing a further gripping action, preventing any possible sliding movement of the chock when the tire is fully engaged on the chock face and molded into openings 29, 30, 31 and 32. Effectively, the tire and vehicle are blocked.

From the above, it is clear that an improved wheel chock is provided having a dual utility for blocking heavy industrial mobile units, trailers and the like to prevent movement. It is useful on all types of surfaces without the need for change-over devices and maximum traction is obtained in any type of weather. The unit is a one-piece cast design, preferably of aluminum, which eliminates welds and weak spots and there are no parts to add, remove or misplace.

What is claimed is:

1. A wheel chock adapted to be used on either of two bottom sides comprising wheel engageable means, a pair of side wall means, intermediate reinforcing wall means, a pair of bottom wall means forming a juncture at an angle to each other, said wheel engageable means having a curved surface and a plurality of openings formed by the termination of said side and intermediate walls, said wheel engageable means forming a tapered juncture with each of said bottom wall means, wheel introducing means disposed at each tapered juncture whereby a wheel initially moving onto said chock applies its load substantially vertically to said wheel introducing means thereby preventing movement of said chock, and one of said bottom walls containing calk means adjacent said juncture.

2. The wheel chock of claim 1 wherein said bottom wall means are disposed to each other at an angle of at least 90°.

3. The wheel chock of claim 1 wherein a said reinforcing wall means terminates at said juncture of said bottom wall means and another of said reinforcing wall means is parallel to said side wall means and terminates at both of said bottom wall means.

4. The wheel chock of claim 1 wherein said wheel introducing means comprise toe plate means.

5. The wheel chock of claim 4 wherein said toe plate means from a continuous surface with said curved surface of said wheel engageable means.

6. The wheel chock of claim 1 wherein said calk means is triangular in shape and forms an obtuse angle with the planar surface of the bottom wall.

7. The wheel chock of claim 1 wherein said side wall means contain openings.

8. The wheel chock of claim 1 wherein said bottom wall means contain openings.

9. The wheel chock of claim 1 wherein said wheel engageable means comprises end portions of two intermediate reinforcing wall means disposed at right angles to each other.

10. The wheel chock of claim 1 wherein said bottom wall means form an obtuse angle at said juncture.

References Cited by the Examiner
UNITED STATES PATENTS
2,862,579  12/1958  Jicha et al. _____ 188—32

MILTON BUCHLER, *Primary Examiner.*

B. S. MOWRY, *Assistant Examiner.*